(12) United States Patent
Payne

(10) Patent No.: US 10,054,456 B2
(45) Date of Patent: Aug. 21, 2018

(54) SELECTIVE LEARNING AND DISPLAY FOR COASTING GUIDANCE SYSTEM

(71) Applicant: Toyota Motor Engineering & Manufacturing North America, Inc., Erlanger, KY (US)

(72) Inventor: Joshua D. Payne, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 35 days.

(21) Appl. No.: 15/340,868

(22) Filed: Nov. 1, 2016

(65) Prior Publication Data

US 2018/0120119 A1    May 3, 2018

(51) Int. Cl.
| | |
|---|---|
| *B60W 20/12* | (2016.01) |
| *G01C 21/34* | (2006.01) |
| *G01C 21/36* | (2006.01) |
| *B60K 6/22* | (2007.10) |

(52) U.S. Cl.
CPC ............ *G01C 21/3469* (2013.01); *B60K 6/22* (2013.01); *B60W 20/12* (2016.01); *G01C 21/3461* (2013.01); *G01C 21/3476* (2013.01); *G01C 21/3484* (2013.01); *G01C 21/3667* (2013.01); *B60Y 2200/92* (2013.01); *B60Y 2300/18066* (2013.01); *B60Y 2300/18125* (2013.01); *Y10S 903/904* (2013.01)

(58) Field of Classification Search
CPC ............ G01C 21/3469; G01C 21/3461; G01C 21/3476; G01C 21/3484; G01C 21/3667; G01C 21/26; B60W 20/12; B60W 30/08072; B60K 6/22; B60Y 2200/92; B60Y 2300/18066; B60Y 2300/18125; Y10S 903/904; B60Q 9/00
USPC ........................................................ 701/457
See application file for complete search history.

(56) References Cited

U.S. PATENT DOCUMENTS

| | | |
|---|---|---|
| 6,321,158 B1 | 11/2001 | DeLorme et al. |
| 6,336,038 B1 | 1/2002 | Nojima et al. |
| 6,711,474 B1 | 3/2004 | Treyz et al. |
| 8,140,265 B2 | 3/2012 | Grush |
| 8,538,462 B2 | 9/2013 | Forstall et al. |
| 8,742,908 B2 | 6/2014 | Boudy |
| 8,966,654 B1 | 2/2015 | Kwak |
| 9,205,843 B2 | 12/2015 | Sannodo et al. |
| 9,347,784 B2 | 5/2016 | Inoue et al. |
| 9,786,172 B2 * | 10/2017 | Takahara ............. G08G 1/0968 |

(Continued)

*Primary Examiner* — McDieunel Marc
(74) *Attorney, Agent, or Firm* — Snell & Wilmer LLP

(57) ABSTRACT

Methods, systems, and apparatus for selectively learning and displaying information for a coasting guidance system. The system includes an electronic control unit (ECU) configured to determine a stop event location where a coasting guidance instruction is displayed. The system includes a memory configured to store one or more stop event locations. The system includes a display configured to display the stored one or more stop event locations on a map. The display is configured to receive an indication of a coasting guidance area on the map. The display is configured to identify a portion of the stored one or more stop event locations within the coasting guidance area. The display is configured to selectively display the portion of the one or more stop event locations on the map such that a stop event location outside of the coasting guidance area is absent from the map.

22 Claims, 10 Drawing Sheets

(56) References Cited

U.S. PATENT DOCUMENTS

| | | |
|---|---|---|
| 2006/0190173 A1 | 8/2006 | Ogura |
| 2007/0129012 A1 | 6/2007 | Snow |
| 2010/0201505 A1 | 8/2010 | Honary et al. |
| 2014/0156188 A1 | 6/2014 | Hart et al. |
| 2015/0298699 A1* | 10/2015 | Poechmueller ... B60W 50/0097 701/25 |
| 2016/0050315 A1 | 2/2016 | Malhotra et al. |
| 2016/0059864 A1 | 3/2016 | Feit et al. |
| 2016/0231131 A1* | 8/2016 | Verheijen ........ B60W 30/18072 |

* cited by examiner

SELECTIVE LEARNING AND DISPLAY FOR COASTING GUIDANCE SYSTEM

BACKGROUND

1. Field

This specification relates to a system and a method for selectively learning and displaying information for a coasting guidance system.

2. Description of the Related Art

Hybrid vehicles may include a regenerative braking system. As the wheels of the vehicle turn, regenerative braking generates electricity from the turning of the axles connected to the wheels. The generated electricity may be stored in a battery and used to power an electric motor. In generating the electricity from the turning of the wheels, the regenerative braking provides resistance to the axles of the vehicle, resulting in a slowing down of the vehicle. By maximizing use of regenerative braking, use of friction braking may be minimized. Accordingly, minimized use of friction braking provides longer friction brake life. When a driver coasts by releasing the brake pedal and the accelerator pedal while the vehicle is moving, regenerative braking may generate electricity for the vehicle. Increased coasting may result in improved fuel efficiency and longer friction brake life.

SUMMARY

What is described is a system for selectively learning and displaying information for a coasting guidance system. The system includes an electronic control unit (ECU) configured to determine a stop event location where a coasting guidance instruction is displayed as the vehicle approaches the stop event location. The system also includes a memory connected to the ECU, the memory configured to store one or more stop event locations. The system also includes a display connected to the ECU. The display is configured to display the stored one or more stop event locations on a map. The display is also configured to receive, from a user, an indication of a coasting guidance area on the map. The display is also configured to identify a portion of the stored one or more stop event locations based on the indicated coasting guidance area, the portion of the one or more stop event locations being within the coasting guidance area. The display is also configured to selectively display the portion of the one or more stop event locations on the map such that a stop event location outside of the coasting guidance area is absent from the map.

Also described is a vehicle. The vehicle includes an electronic control unit (ECU) configured to determine a stop event location where a coasting guidance instruction is displayed as the vehicle approaches the stop event location. The vehicle also includes a memory connected to the ECU, the memory configured to store one or more stop event locations. The vehicle also includes a display connected to the ECU. The display is configured to display the stored one or more stop event locations on a map. The display is also configured to receive, from a user, an indication of a coasting guidance exclusion area on the map. The display is also configured to identify a portion of the stored one or more stop event locations based on the indicated coasting guidance exclusion area, the portion of the one or more stop event locations being within the coasting guidance exclusion area. The display is also configured to remove, from the map, the portion of the one or more stop event locations such that a stop event location inside the coasting guidance exclusion area is absent from the map.

Also described is a method of selectively learning and displaying information for a coasting guidance system. The method includes determining, by an electronic control unit (ECU), a stop event location where a coasting guidance instruction is displayed as the vehicle approaches the stop event location. The method also includes storing, by a memory connected to the ECU, one or more stop event locations. The method also includes displaying, by a display connected to the ECU, the stored one or more stop event locations on a map. The method also includes receiving, by the display from a user, an indication of a coasting guidance area on the map. The method also includes identifying, by the display, a first portion of the stored one or more stop event locations based on the indicated coasting guidance area, the first portion of the one or more stop event locations being within the coasting guidance area. The method also includes identifying, by the display, a second portion of the stored one or more stop event locations based on the indicated coasting guidance area, the second portion of the one or more stop event locations being outside of the coasting guidance area. The method also includes selectively displaying, by the display, the first portion of the one or more stop event locations on the map such that only the first portion of the one or more stop event locations are displayed on the map and the second portion of the one or more stop event locations are not displayed on the map.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles and methods for selectively learning and displaying information for a coasting guidance system. A coasting guidance system may instruct a driver as to when to disengage from the brake pedal and the accelerator pedal, so that regenerative braking may bring the vehicle to a stop while generating electricity. Coasting may improve the fuel efficiency of the vehicle. The coasting guidance system may, over time, identify stop event locations where coasting guidance instructions are displayed. The stop event locations may be displayed on a map provided by the coasting guidance system.

However, the driver may wish to identify areas where the stop event locations should be removed or concealed. The driver may desire more privacy in selectively displaying where the driver has been frequently driving to. In addition, a coasting guidance instruction may not be provided for those stop event locations that have been removed. The driver may determine that coasting guidance instructions are not desired in some locations, and therefore may identify those areas so that the stop event locations do not appear on the map and coasting guidance instructions are not provided. In addition to increased privacy and customization of the coasting guidance system, other benefits and advantages include conserving system resources when limiting use of the coasting guidance system in the identified areas.

Figure 1A:
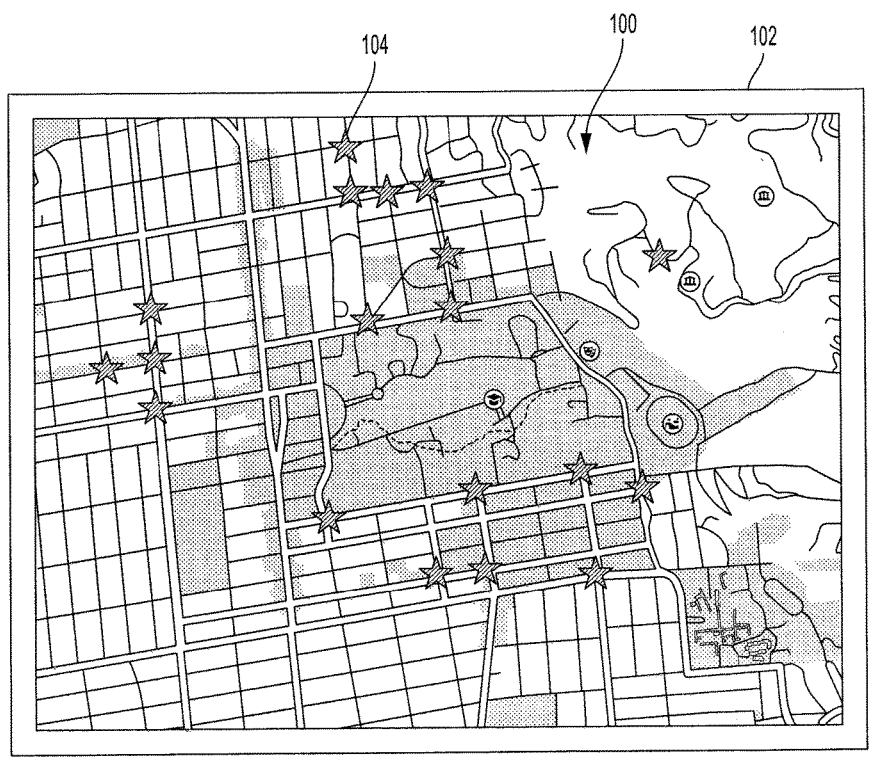
FIG. 1A is an example display of a coasting guidance system for a vehicle with all stored event stop locations displayed, according to an aspect of the invention.

FIG. 1A is an example display of the coasting guidance system for a vehicle. The display 102 is configured to display a map 100. The display 102 may be located anywhere in the vehicle. The display 102 may be an entertainment unit display or a navigation display, for example. The map 100 includes multiple stop event locations 104. A stop event may be a stop sign, a traffic signal, an accident location and/or a location where traffic is at a standstill.

The stop event locations 104 are represented on the map 100 with an icon, such as a star, a stop sign, or a colored circle, for example. The stop event locations 104 are locations where the coasting guidance system provides a coasting guidance instruction. The coasting guidance instruction is an instruction provided to the driver of the vehicle to engage in coasting. A driver who coasts may disengage the brake pedal and the accelerator pedal. In doing so, the vehicle may utilize regenerative braking to bring the vehicle to a complete stop and to generate electricity to be used by the vehicle.

The coasting guidance system may determine the stop event location 104 based on a stored location of a previously travelled stop event. In a previously travelled route, the coasting guidance system may determine that the vehicle is stopping based on the speed of the vehicle. That is, the coasting guidance system may determine that the speed of the vehicle is below a threshold speed, such as 4 mph, and is decreasing which may indicate that the vehicle is stopping. The coasting guidance system may associate the location of the vehicle with a stop event and store the stop event in a memory so that if the vehicle approaches the location on a subsequent route, the coasting guidance system recalls the location of the stored stop event by comparing the current location of the vehicle with the location of the stored stop event that was stored. The coordinates of the vehicle that are associated with the stored stop event and the current location of the vehicle may be obtained using a navigation unit.

The coasting guidance system may count a number of times that the vehicle stops or partially stops at a location or within a range of the location, and store the location as a stop event location 104 if the number of times that the vehicle stops or partially stops at the stop event location 104 or is within the range of the stop event location 104 is greater than or equal to a threshold value. Accordingly, the stop event locations 104 may represent where the vehicle has travelled most frequently.

Figure 1B:
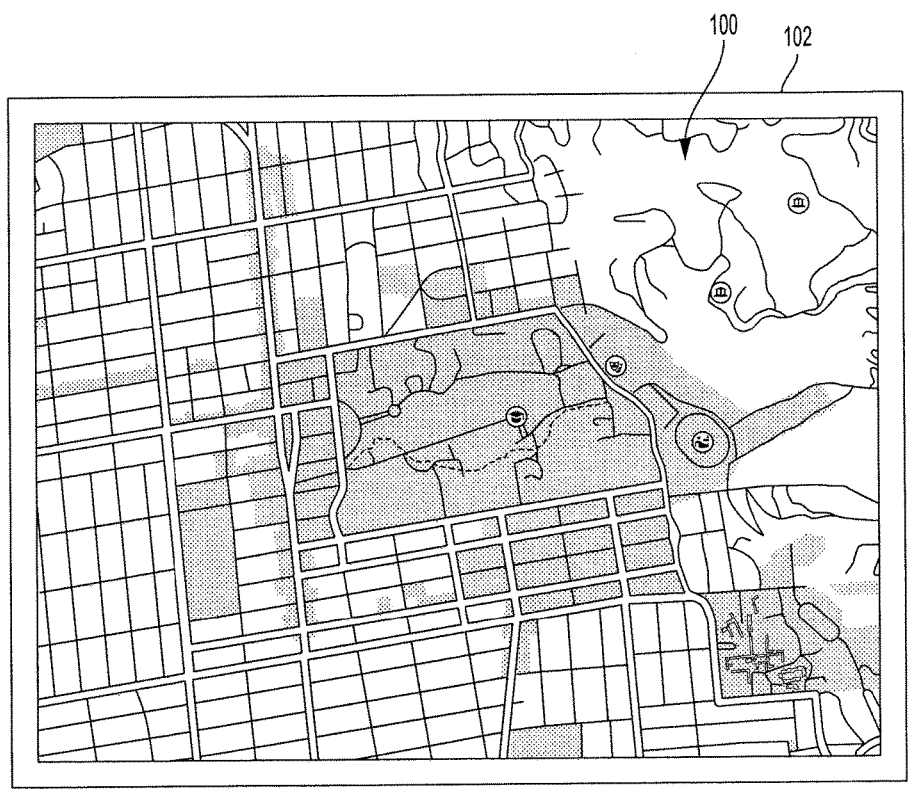
FIG. 1B is an example display of a coasting guidance system for a vehicle with no stored event stop locations displayed, according to an aspect of the invention.

A user of the vehicle may wish to remove the stop event locations 104 from the map 100 to conceal where the vehicle frequently travels, for privacy purposes. FIG. 1B is an example display 102 of the coasting guidance system for a vehicle with the stop event locations 104 removed. By removing all of the stop event locations 104 from the map 100, an individual viewing the map 100 is unable to discern or determine where the vehicle has been travelling. However, the user of the vehicle may not wish to conceal all of the stop event locations 104. The user of the vehicle may wish to identify a group of stop event locations 104 to remove or conceal, while leaving the rest of the stop event locations 104 visible on the map 100. The user of the vehicle may identify an area on the map 100 where the stop event locations 104 within the identified area should be removed or concealed. In some embodiments, the coasting guidance system may not provide coasting guidance instructions on the display 102 when the vehicle approaches the stop event locations 104 within the identified area. In some embodiments, the coasting guidance system may be disabled while the vehicle is within the identified area, in order to conserve system resources, such as the memory and the processing resources. In some embodiments, the coasting guidance system may not display the stop event locations 104 on the map 100, but may provide coasting guidance instructions on the display 102 when the vehicle approaches any of the stop event locations 104.

Figure 2A:
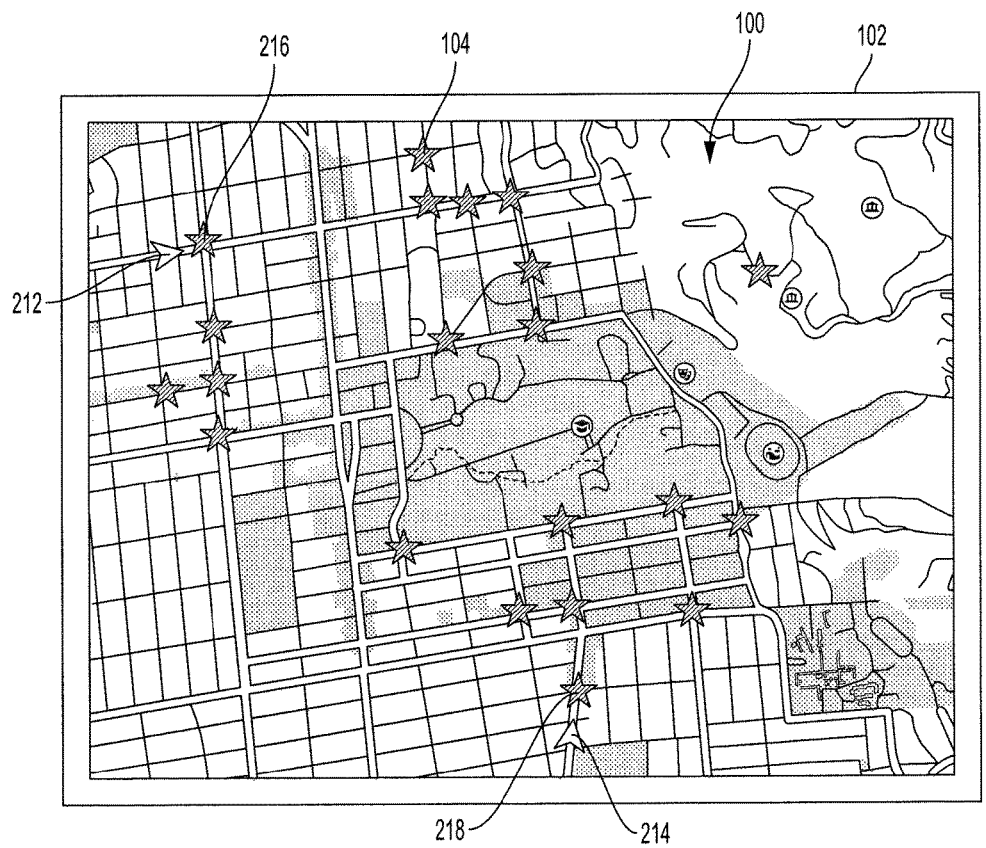
FIG. 2A is an example display of a coasting guidance system for a vehicle with all stored event stop locations displayed and with current vehicle locations displayed, according to an aspect of the invention.

FIG. 2A is an example display 102 displaying a map 100 of an area and the stop event locations 104 associated with the vehicle. Similar to FIG. 1A, the map 100 of FIG. 2 indicates, to a viewer of the map 100 where the vehicle may frequently travel. Stop event locations 214 and 216 are part of the stop event locations 104. A vehicle located at location 212 and approaching stop event location 216 may be presented with a coasting guidance instruction. Similarly, a vehicle located at location 214 and approaching stop event location 218 may be presented with a coasting guidance instruction.

Figure 2B:
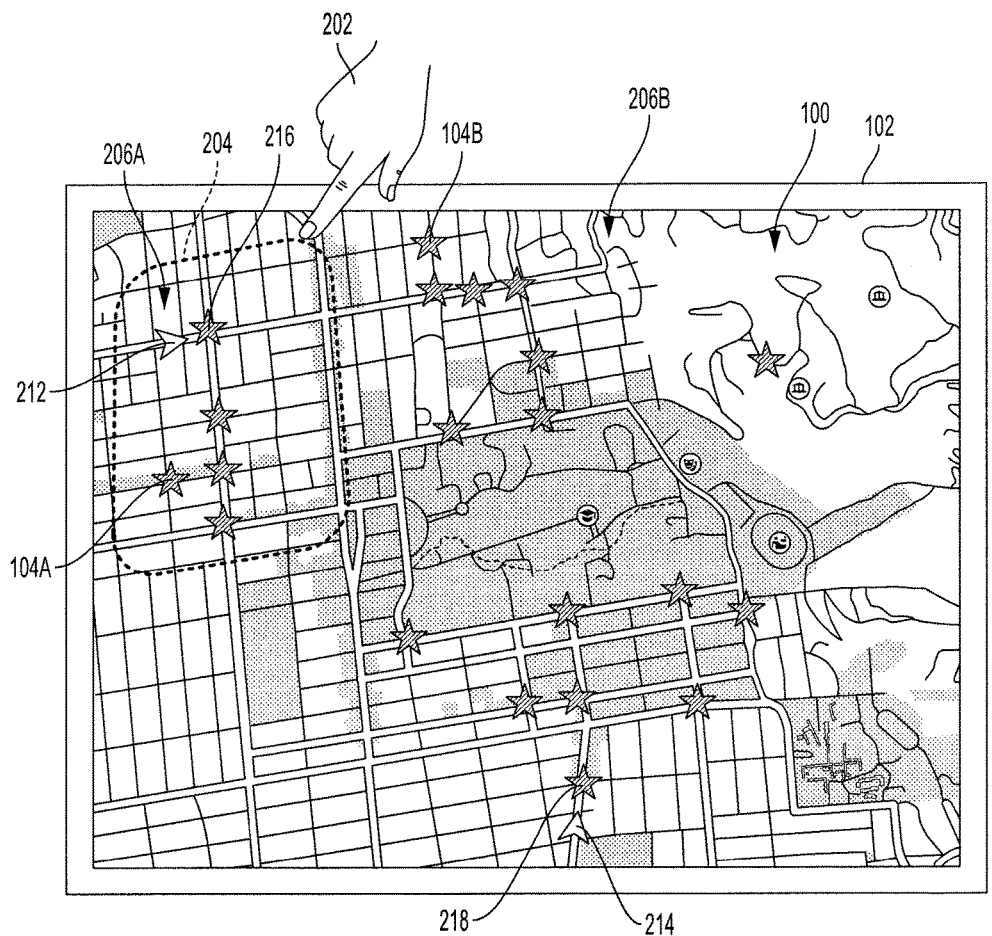
FIG. 2B is an example display of a coasting guidance system for a vehicle with a user indicating a boundary between a coasting guidance area and a coasting guidance exclusion area, according to an aspect of the invention.

FIG. 2B illustrates a user identifying a coasting guidance area on the map 100. The display 102 displays a map 100 with stop event locations 104. The user 202 identifies a boundary 204 on the map 100. The display 102 may be a touchscreen display capable of detecting contact with the display 102, and the user 202 may identify the boundary 204 by touching the display 102 and dragging a finger of the user 202 to form the boundary 204.

The boundary 204 may be any shape and/or size within the map 100. The boundary 204 may have straight edges, curved edges, or any combination thereof. The boundary 204 separates a coasting guidance exclusion area 206A and a coasting guidance area 206B. The stop event locations 104A within the coasting guidance exclusion area 206A will be removed or concealed from the map 100. The stop event locations 104B within the coasting guidance area 206B will remain visible on the map 100. In other words, the stop event locations 104A outside of the coasting guidance area 206B will be removed or concealed from the map 100 and the stop event locations 104B outside of the coasting guidance exclusion area 206A will remain visible on the map 100.

While the boundary 204 is shown as being an enclosed shape with the coasting guidance exclusion area 206A within the boundary 204, the user 202 may draw a boundary 204 that is a line, starting at a first edge of the map 100 and ending at a second edge of the map 100, such that an enclosed shape is not drawn. In these situations, the edges of the map 100 connecting the start of the line to the end of the line may be used to form the rest of the boundary 204. Alternatively, an error message may be displayed on the display 102 requiring the user 202 to draw an enclosed shape.

In some embodiments, more than one boundary may be identified. For example, the user may draw multiple enclosed shapes on the map 100 indicating multiple coasting guidance areas or coasting guidance exclusion areas.

In some embodiments, a type of surface or area may be identified instead of a location on a map, and any stop event location falling within the identified type may be removed or concealed from the map 100. For example, the user may identify freeway on-ramps or alleyways as being coasting guidance exclusion areas, and any stop event location that is categorized as being on a freeway on-ramp or in an alleyway will be removed or concealed from the map 100.

Further, while FIG. 2B illustrates the coasting guidance exclusion area 206A as being inside of the boundary 204 identified by the user 202, whether the boundary 204 encloses the coasting guidance exclusion area (and therefore removes stop event locations within the boundary) or the coasting guidance area (and therefore removes stop event locations outside of the boundary) may be predetermined by the user 202.

Figure 2C:
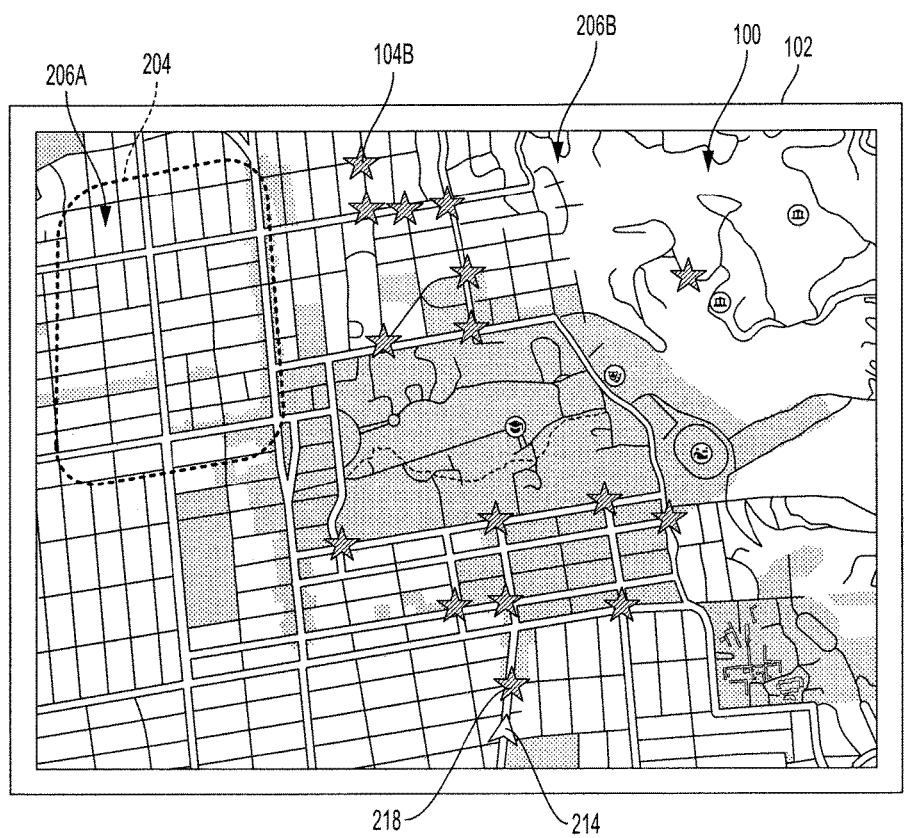
FIG. 2C is an example display of a coasting guidance system for a vehicle with the coasting guidance area outside of the boundary, according to an aspect of the invention.

FIG. 2C illustrates the map with the stop event locations within the coasting guidance exclusion area removed. The stop event locations 104A within the coasting guidance exclusion area 206A (i.e., outside of the coasting guidance area 206B or not within the coasting guidance area 206B) are removed, when compared with the map 100 of FIG. 2B.

As described herein, when the vehicle approaches one of the removed stop event locations 104A, a coasting guidance instruction may not be provided. For example, when the vehicle is at location 212 and approaching stop event location 216, a coasting guidance instruction may not be provided. Alternatively, in some embodiments, the coasting guidance system may not display the removed stop event locations 104A on the map 100, but may provide coasting guidance instructions on the display 102 when the vehicle approaches any of the stop event locations 104, including the removed stop event locations 104A, regardless of whether the vehicle and/or the stop event location being approached is in the coasting guidance exclusion area.

Further, when the vehicle is within the coasting guidance exclusion area 206A, the coasting guidance system may be fully or partially disabled. In this way, aside from privacy motivations, the user 202 may identify the coasting guidance exclusion area 206A for the purpose of conserving system resources in that particular area, when the user 202 does not find the coasting guidance instructions useful in that particular area. For example, the coasting guidance exclusion area 206A may be particularly congested at all times and the coasting guidance instructions may not result in significant fuel efficiency gains. In another example, the coasting guidance exclusion area 206A may be particularly difficult to navigate, with many pedestrians, and the user 202 may wish to minimize potential distractions while driving. For example, when the vehicle is at location 212, the coasting guidance system may be fully or partially disabled.

Figure 2D:
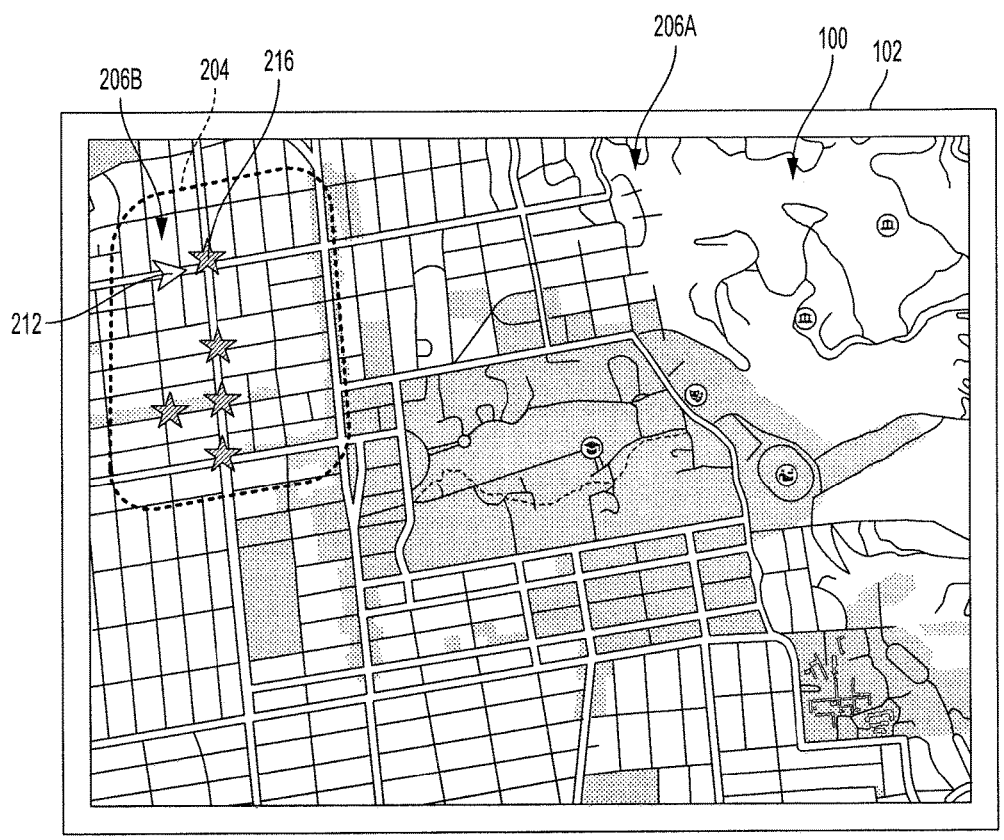
FIG. 2D is an example display of a coasting guidance system for a vehicle with the coasting guidance area within the boundary, according to an aspect of the invention.

FIG. 2D illustrates an example embodiment where the user indicates the coasting guidance area with the boundary. In FIG. 2D, the coasting guidance area 206B is enclosed by the boundary 204 and the coasting guidance exclusion area 206A is outside of the boundary 204. As compared with FIG. 2C, where the user may identify an area to remove, in FIG. 2D, the user identifies an area to keep, and the stop event locations outside of the identified area are removed.

The user 202 may choose to undo the identification of the coasting guidance exclusion area. The memory may not erase the stop event locations within the coasting guidance exclusion area when the coasting guidance exclusion area is identified, so that the removed or concealed stop event locations may be re-displayed if requested by the user 202. In some embodiments, the ability to undo the identification of the coasting guidance exclusion area to reveal all stop event locations may be protected by credentials, such as a username and a password.

Figure 3:
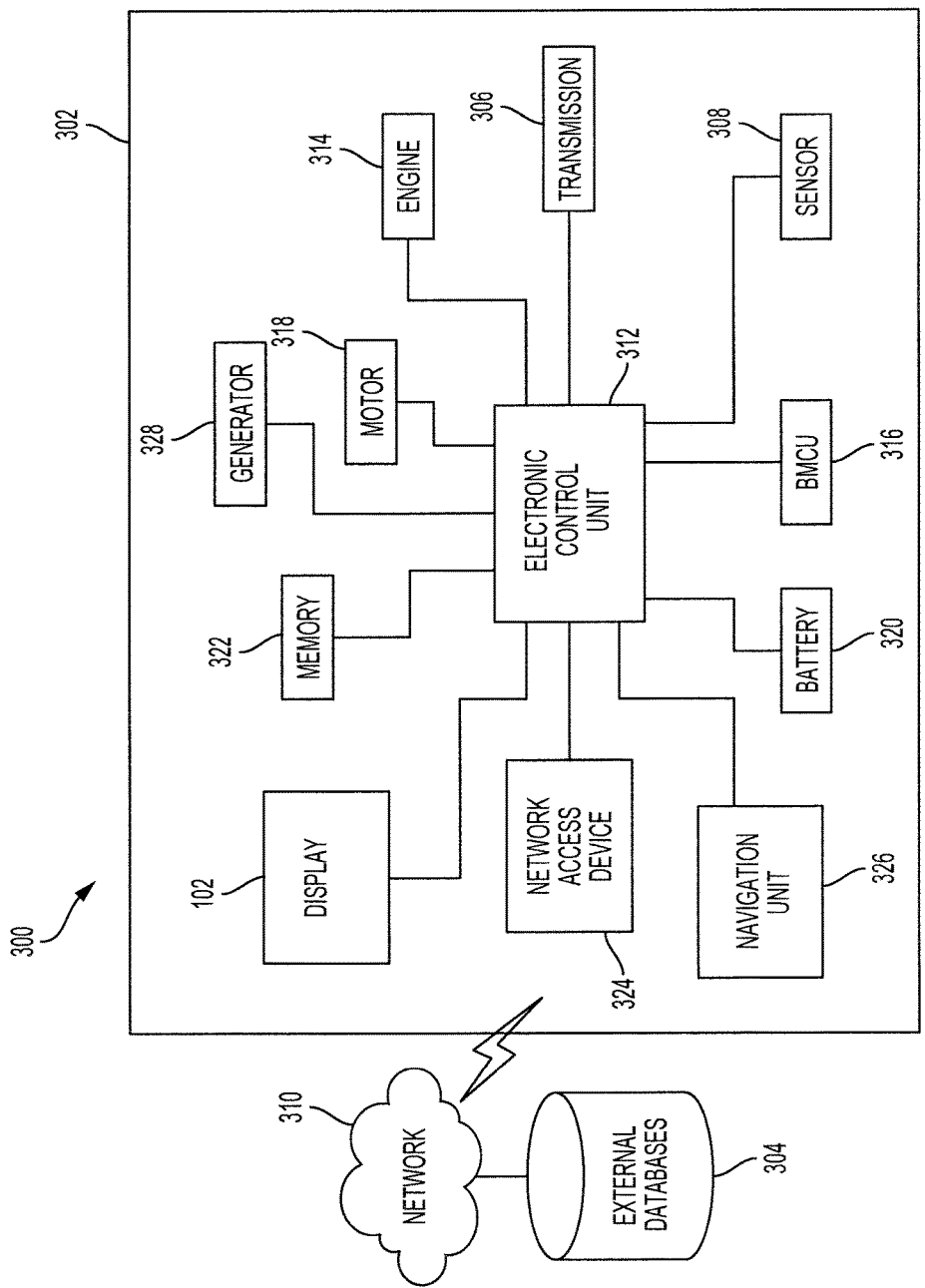
FIG. 3 is a block diagram of an example coasting guidance system for a vehicle, according to an aspect of the invention.

FIG. 3 is a block diagram of an example coasting guidance system 300 for a vehicle 302. The coasting guidance system 300 may include one or more computers or electronic control units (ECUs) 312, appropriately programmed, to control coasting in the vehicle 302. The coasting guidance system 300 may include a navigation unit 326, a display 102, a memory 322, one or more sensors 308, and/or a network access device 324.

Coasting involves the movement or propulsion of the vehicle 302 without the use of fuel or electrical energy. Other forms of energy, such as inertia or gravity, may move or propel the vehicle 302. The coasting guidance system 300 may provide coasting information to a driver (or user), for example, through the display 102. The coasting information may include notifications, such as a notification that indicates to the driver to begin coasting, energy and mileage information related to the coasting, and/or distance information to an ideal coasting location and/or a braking location. The coasting guidance system 300 may control a deceleration drive force that controls the deceleration of a vehicle 302 while coasting.

The coasting guidance system 300 may be included in a vehicle 302 and connected to one or more external databases 304 through a network 310. A vehicle 302 is a conveyance capable of transporting a person, an object, or a permanently or temporarily affixed apparatus. A vehicle 302 may be a self-propelled wheeled conveyance, such as a car, sports utility vehicle, truck, bus, van or other motor or battery driven vehicle. The vehicle 302 may include a motor 318, a generator 328, an engine 314, and a transmission 306. For example, the vehicle 302 may be an electric vehicle, a hybrid vehicle, a plug-in hybrid vehicle or any other type of vehicle that includes the motor 318 and/or the generator 328. Other examples of vehicles include bicycles, trains, planes, or boats, and any other form of conveyance that is capable of transportation. The vehicle 302 may be a semi-autonomous vehicle or an autonomous vehicle. That is, the vehicle 302 may be self-maneuvering and navigate without human input. An autonomous vehicle may use one or more sensors 308 and/or the navigation unit 326 to drive autonomously.

The vehicle 302 may be coupled to a network 310. The network 310, such as a local area network (LAN), a wide area network (WAN), a cellular network, a digital short-range communication (DSRC), the Internet, or a combination thereof, connects the vehicle 302 and/or the coasting guidance system 300 to the one or more external databases 304. The external databases 304 may include databases from different service providers. A service provider may provide navigational map, weather and/or traffic condition information to the vehicle 302.

A database is any collection of pieces of information that is organized for search and retrieval, such as by a computer, and the database may be organized in tables, schemas, queries, report, or any other data structures. A database may use any number of database management systems. An external database 304 may include a third-party server or website that stores or provides information. The information may include real-time information, periodically updated information, or user-inputted information. A server may be a computer in a network that is used to provide services, such as accessing files or sharing peripherals, to other computers in the network. A website may be a collection of one or more resources associated with a domain name.

Navigational map information includes political, roadway and construction information. Political information includes political features such as cities, states, zoning ordinances, laws and regulations, and traffic signs, such as a stop sign, or traffic signals. For example, laws and regulations may include the regulated speed on different portions of a road or noise ordinances. Roadway information includes road features such the grade of an incline of a road. Construction information includes construction features such as construction zones and construction hazards.

Traffic condition information includes one or more traffic condition features, such as traffic congested areas or accident areas. The traffic condition information may provide information related to the density and movement of vehicles on a roadway and/or accident locations.

Features, e.g., road features, political features, or traffic condition features, each have a location that may be identified by map coordinates. The map coordinates may be defined by latitude and longitudinal coordinates.

The vehicle 302 may include an engine 314, a motor 318, a generator 328, a battery 320 and a battery management and control unit (BMCU) 316. The motor 318 and/or the generator 328 may be an electric motor and an electric generator that converts electrical energy into mechanical power, such as torque, and converts mechanical power into electrical energy. The motor 318 and/or the generator 328 may be coupled to the battery 320. The motor 318 and/or the generator 328 may convert the energy from the battery 320 into mechanical power, and may provide energy back to the battery 320, for example, via regenerative braking. In some embodiments, the vehicle 302 may include one or more additional power generation devices, such as the engine 314. The engine 314 combusts fuel to provide power instead of and/or in addition to the power supplied by the motor 318 and/or the generator 328.

The battery 320 may be coupled to the motor 318 and/or the generator 328 and may provide electrical energy to and receive electrical energy from the motor 318 and/or the generator 328. The battery 320 may include one or more rechargeable batteries.

The BMCU 316 may be coupled to the battery 320 and control and manage the charging and discharging of the battery 320. The BMCU 316, for example, may measure, using battery sensors (not shown), parameters used to determine the state of charge (SOC) of the battery 320.

The one or more ECUs 312 may be implemented as a single ECU or in multiple ECUs. The ECU 312 may be electrically coupled to some or all of the components of the vehicle 302. The ECU 312 may be coupled to at least one of the navigation unit 326, the one or more sensors 308, the network access device 324 or the memory 322. The ECU 312 may include one or more processors or controllers specifically designed for controlling one or more coasting guidance features, such as providing notifications to the driver and/or controlling the deceleration drive force of the vehicle 302. For example, the ECU 312 may determine when to notify the driver of an ideal coasting location that maximizes coasting of the vehicle 302 to a stop event.

The memory 322 may be coupled to the ECU 312. The memory 322 may store instructions to execute on the ECU 312 and may include one or more of a RAM or other volatile or non-volatile memory. The memory 322 may be a non-transitory memory or a data storage device, such as a hard disk drive, a solid-state disk drive, a hybrid disk drive, or other appropriate data storage, and may further store machine-readable instructions, which may be loaded and executed by the ECU 312. The memory 322 may store corresponding driver response times for the driver and configuration settings to enable/disable features of the coasting guidance system 300, such as whether to display locations where coasting guidance may be provided.

The network access device 324 may include a communication port or channel, such as one or more of a Wi-Fi unit, a Bluetooth® unit, a Radio Frequency Identification (RFID) tag or reader, a DSRC unit, or a cellular network unit for accessing a cellular network (such as 3G or 4G). The network access device 324 may transmit data to and receive data from devices and systems not directly connected to the vehicle 302. For example, the ECU 312 may communicate with the external databases 304. Furthermore, the network access device 324 may access the network 310, to which the external databases 304 are also connected.

The one or more sensors 308 may be coupled to the ECU 312 and include a vehicle speed sensor, an acceleration input sensor, a brake sensor, and/or one or more proximity sensors. The vehicle speed sensor measures the speed of the vehicle 302, for example, by measuring the total revolutions of the wheel per minute. The brake sensor measures the amount of pressure applied to the brake pedal. The acceleration input sensor measures the amount of pressure applied to the accelerator pedal. The one or more proximity sensors may be positioned on the front and/or the rear of the vehicle 302 to detect surrounding vehicles and/or objects that are within a threshold distance of the vehicle 302 in the front and/or the back of the vehicle 302, respectively. The proximity sensor may use a radar, a camera, vehicle-to-vehicle (V2V) communications or other means to detect and/or measure a distance to the other vehicles or objects. The one or more sensors 308 may include one or more cameras that may be used to identify a driver to determine the driver's response time and/or other driver specific configurations to control the vehicle 302.

The navigation unit 326 may be coupled to the ECU 312 and provide vehicle information and/or navigation information to the ECU 312. The vehicle information may include the current location, the direction and/or the speed of the vehicle 302. The navigation information may include a route that the vehicle 302 is or will be travelling. The route may include a starting location, a destination location and/or a path between the starting location and the destination location.

Figure 4:
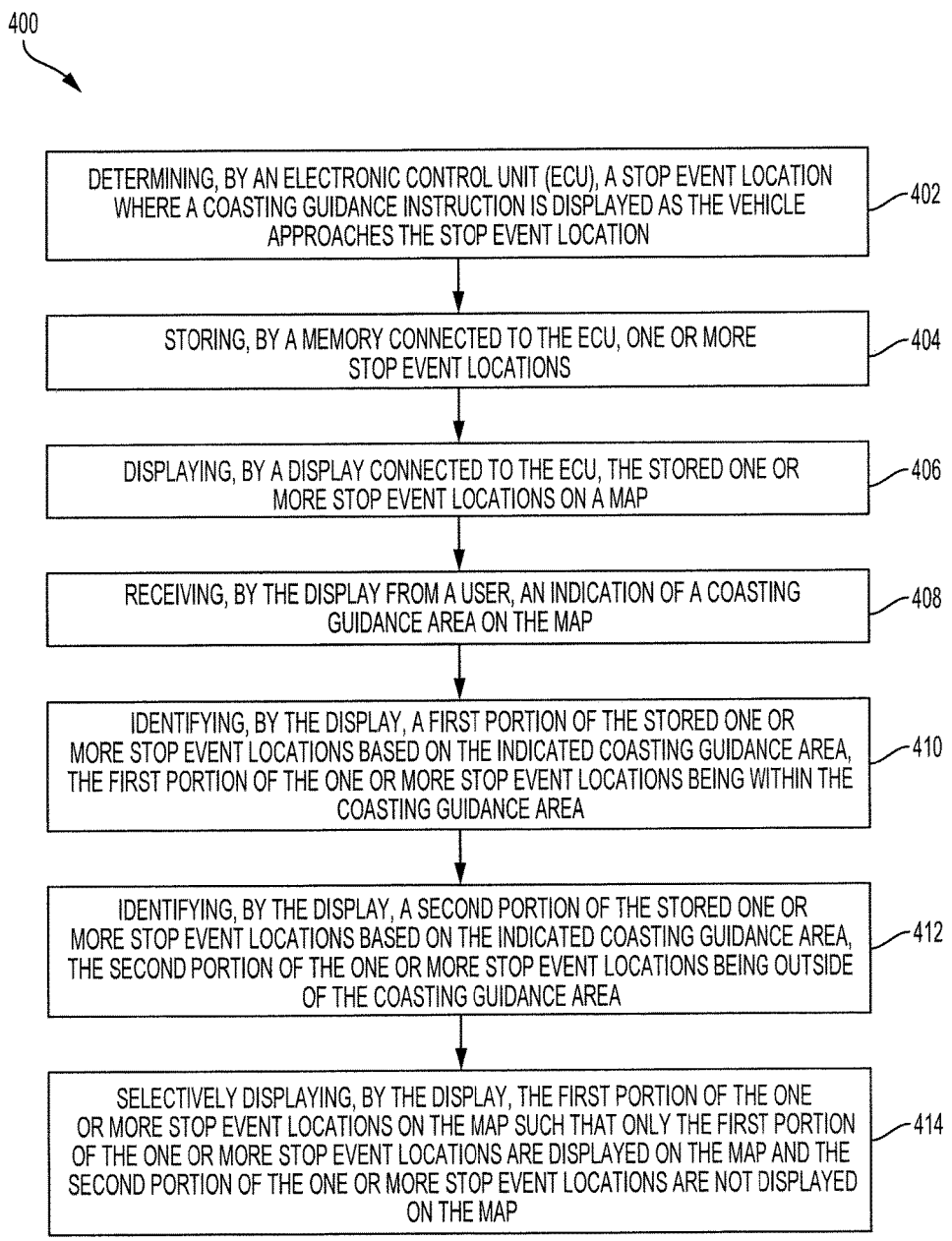
FIG. 4 is a flow diagram of an example process for selectively determining and displaying stop event locations, according to an aspect of the invention.

FIG. 4 is a flow diagram of an example process 40Q for selectively learning and displaying locations where coasting guidance may be provided. One or more computers or one or more data processing apparatuses, for example, the ECU 312 of the coasting guidance system 300 of FIG. 3, appropriately programmed, may implement the process 400.

The ECU 312 of the coasting guidance system 300 determines a stop event location (e.g., stop event location 104) where a coasting guidance instruction is displayed as the vehicle 302 approaches the stop event location (step 402). The coasting guidance system 300 may also determine a current location of the vehicle 302 using the navigation unit 326, for example, by using a GPS receiver to determine the current location of the vehicle 302.

As disclosed herein, a stop event location 104 may be a stop sign, a traffic signal, an accident location and/or a location where traffic is at a standstill. The coasting guidance system 300 may obtain the stop event location from the navigational map information obtained by the navigation unit 326 from the one or more external databases 304 or from the one or more sensors 308. The navigation unit 326 may obtain the navigational map information including the locations of one or more stop events, such as a stop sign, traffic, or a red traffic signal, from the one or more external databases 304 through the network 310. The navigational map information may include real-time traffic signal information. If the navigational map information indicates that the stop event is a traffic light, the coasting guidance system 300 may determine from the real-time traffic signal information, the color of the traffic light when the vehicle 302 arrives at the location of the traffic light. If the coasting guidance system 300 determines that the traffic light will be green, the coasting guidance system 300 may disregard the traffic light as a stop event and determine the location of the next stop event. The coasting guidance system 300 may adjust the location of the stop event based on the traffic condition information (e.g., if one or more vehicles are stopped at the stop event). The traffic condition information may be obtained from the one or more sensors 308 or from the one or more external databases 304.

In some embodiments, a sensor 308, such as a front vehicle proximity sensor, may be positioned on the front of the vehicle 302, and may be configured to detect a stop event, such as one or more vehicles in front of the vehicle 302 that are at a standstill. If the one or more vehicles that are at a standstill begin moving, the coasting guidance system 300 may determine the location of the next stop event.

The one or more sensors 308 may detect if there are vehicles in front of the vehicle 302. If there are no vehicles in front of the vehicle 302, the coasting guidance system 300 may determine that the vehicle 302 is stopping due to a stationary stop event, such as a traffic sign, and not an arbitrary stop event, such as traffic, that may not be present in a subsequent route. The coasting guidance system 300 may differentiate between stationary and arbitrary stop events when storing the stop events.

The memory 322 stores one or more previously determined stop event locations (step 404). In an example embodiment, in a previously travelled route, the coasting guidance system 300 may determine that the vehicle 302 is stopping based on the speed of the vehicle 302. That is, the coasting guidance system 300 may determine that the speed of the vehicle 302 is below a threshold speed, such as 4 mph, and is decreasing which may indicate that the vehicle is stopping. The coasting guidance system 300 may associate the location of the vehicle 302 with a stop event and store the stop event in the memory 322 so that if the vehicle 302 approaches the location on a subsequent route the coasting guidance system 300 recalls the location of the stored stop event by comparing the current location of the vehicle 302 with the location of the stored stop event that was stored. The coordinates of the vehicle 302 that are associated with the stored stop event and the current location 406 of the vehicle 302 may be obtained using the navigation unit 326. The coasting guidance system 300 may count a number of times that the vehicle 302 stops or partially stops at a location or within a range of the location, and store the location as a stop event if the number of times that the vehicle 302 stops or partially stops at the location or within the range of the location exceeds a stop event location frequency threshold. A partial stop may be, for example, when the vehicle 302 slows down to turn but does not completely stop. The coasting guidance system 300 may decrease the number of times that the vehicle 302 stops or partially stops at a location or within the range of the location if the vehicle 302 drives through the location without stopping or partially stopping. The coasting guidance system 300 may use a combination of stored stop events and/or navigational map information to determine the location of the one or more stop events.

The display 102 displays the stored stop event locations 104 on a map 100 (step 406). As described herein, icons may be used to indicate the stored stop event locations 104. Alternatively, or in addition, the stored stop event locations 104 may be displayed as a list, with a name and/or location information corresponding to each stored stop event location 104. For example, the list may be a list of intersections and a city, state, and country where stop event locations have been stored. The user may navigate a series of menu options to prompt the map 100 and the stored stop event locations 104 to be displayed on the display 102. The user may further navigate one or more menu options to indicate to the coasting guidance system 300 that the user will indicate a boundary 204, and whether the area enclosed by the boundary 204 designates the coasting guidance area or the coasting guidance exclusion area.

The display 102 receives, from the user, an indication of a coasting guidance area on the map 100 (step 408). As shown in FIG. 2B, the user 202 may indicate a boundary 204 separating the coasting guidance area 206B and the coasting guidance exclusion area 206A. The user 202 may use a finger and touch the display 102 to indicate the boundary, or the user 202 may give spoken directions to the coasting guidance system 300, for example. When the user 202 provides spoken directions, the user 202 may identify street names as boundaries. The coasting guidance system 300 may detect the identified street names using sensor 308, which may be a microphone configured to detect audio data.

The user 202 identifying the boundary 204 results in dividing the map 100 into two areas—the coasting guidance area 206B and the coasting guidance exclusion area 206A. Whether the coasting guidance area 206B or the coasting guidance exclusion area 206A is within the boundary 204 or outside of the boundary 204 may be specified by the user 202, and may be stored as a configurable setting in the memory 322. In the example embodiment shown in FIG. 2C, the area within the boundary 204 is the coasting guidance exclusion area 206A and the area outside of the boundary 204 is the coasting guidance area 206B. In the example embodiment shown in FIG. 2D, the area within the boundary 204 is the coasting guidance area 206B and the area outside the boundary 204 is the coasting guidance exclusion area 206A. Once the user has identified the boundary 204, a confirmation prompt may be displayed by the display 102, and the user may choose to confirm or cancel the identified boundary 204.

The display 102 identifies a first portion of the stored stop event locations based on the indicated coasting guidance area, the first portion of the stored stop event locations being within the coasting guidance area (step 410). In some embodiments, the display 102 communicates coasting guidance area data to the ECU 312. The ECU 312 may determine which of the stored stop event locations 104 are within the coasting guidance area 206B based on the coasting guidance area data received from the display 102. In some embodiments, the boundary 204 is represented by one or more geographic location coordinates (e.g., latitude and longitude) and the stored stop event locations 104 may also be represented by geographic location coordinates. The ECU 312 may determine the stored stop event locations 104B that are within the coasting guidance area 206B, from among all of the stored stop event locations 104. The ECU 312 may communicate, to the display 102, the stop event locations 104B within the coasting guidance area 206B.

The display 102 identifies a second portion of the stored stop event locations based on the indicated coasting guidance area, the second portion of the stored stop event locations being outside of the coasting guidance area (step 412). That is, the second portion of the stored stop event locations is located within the coasting guidance exclusion area. In some embodiments, the display 102 communicates coasting guidance area data to the ECU 312. The ECU 312 may determine which of the stored stop event locations 104 are outside of the coasting guidance area 206B based on the coasting guidance area data received from the display 102. In some embodiments, the boundary 204 is represented by one or more geographic location coordinates (e.g., latitude and longitude) and the stored stop event locations 104 may also be represented by geographic location coordinates. The ECU 312 may determine the stored stop event locations 104A that are outside the coasting guidance area 206B, from among all of the stored stop event locations 104. The ECU 312 may communicate, to the display 102, the stop event locations 104A outside the coasting guidance area 206B.

While both steps 410 and 412 are shown in the process 400, in some embodiments, only one of steps 410 or 412 may be performed. When only one of step 410 or step 412 is performed, both the stop event locations 104B within the coasting guidance area 206B and the stop event locations 104A outside of the coasting guidance area 206B may still be determined. For example, if the stop event locations 104B within the coasting guidance area 206B are determined, then the remaining stop event locations in the stored stop event locations may be determined to be outside of the coasting guidance area 206B. Likewise, if the stop event locations 104A outside of the coasting guidance area 206B are determined, then the remaining stop event locations in the stored stop event locations may be determined to be within the coasting guidance area 206B.

The display 102 selectively displays the first portion of the stop event locations on the map such that only the first portion of the stop event locations are displayed on the map and the second portion of the stop event locations are not displayed on the map (step 414). As shown in FIG. 2C, the stop event locations 104B within the coasting guidance area 206B (i.e., the stop event locations 104B outside of the coasting guidance exclusion area 206A) are shown and the stop event locations 104A outside of the coasting guidance area 206B (i.e., the stop event locations 104A within the coasting guidance exclusion area 206A) are not displayed on the map 100.

Figure 5:
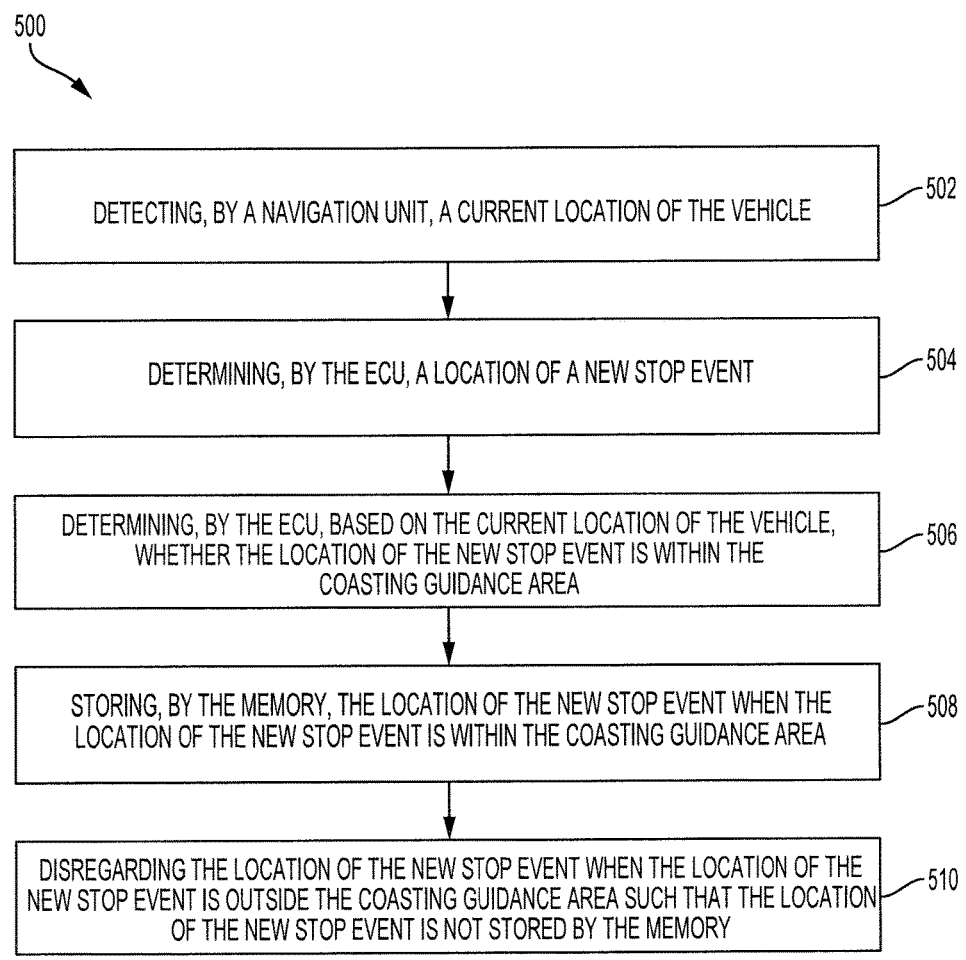
FIG. 5 is a flow diagram of an example process for selectively determining a new stop event location, according to an aspect of the invention.

FIG. 5 is a flow diagram of an example process 500 for selectively determining stop event locations after a coasting guidance area and coasting guidance exclusion area have been established by the user. One or more computers or one or more data processing apparatuses, for example, the ECU 312 of the coasting guidance system 300 of FIG. 3, appropriately programmed, may implement the process 500.

The navigation unit 326 detects a current location of the vehicle 302 (step 502). The coasting guidance system 300 may determine the current location using the navigation unit 326 by using a GPS receiver to determine the current location of the vehicle 302. The ECU 312 determines the location of a new stop event (step 504). As described herein, a stop event may be a stop sign, a traffic signal, an accident location and/or a location where traffic is at a standstill. A new stop event location may be a location that is not yet determined to be a stop event location and is therefore not stored in the memory 322.

The ECU 312 determines whether the location of the new stop event is within the coasting guidance area (step 506). For example, in FIG. 2A, when the current location of the vehicle 302 is at location 212, the vehicle 302 may be approaching a new stop event location 216. The new stop event location 216 is outside of the coasting guidance area 206B, as shown in FIG. 2B. In contrast, when the current location of the vehicle 302 is at location 214 in FIG. 2A, the vehicle 302 may be approaching a new stop event location 218. The new stop event location 218 is within the coasting guidance area 206B, as shown in FIG. 2B.

The memory 322 stores the location of the new stop event location when the new stop event location is within the coasting guidance area (step 508). For example, when the new stop event location is location 218 shown in FIG. 2B, the new stop event location 218 is stored in the memory 322. The memory 322 may store the new stop event location 218 as an ordered tuple of coordinates (e.g., latitude and longitude).

When the new stop event location is outside of the coasting guidance area, the new stop event location is disregarded or discarded such that the new stop event location is not stored in the memory 322 (step 510). For example, when the new stop event location is location 216 shown in FIG. 2B, the new stop event location 216 is disregarded or discarded and is not stored in the memory 322 because the location 216 is outside of the coasting guidance area.

In some embodiments, the new stop event location is stored in the memory 322, regardless of whether the new stop event location is within the coasting guidance area or outside the coasting guidance area, but the new stop event location is not displayed on the map 100 when the new stop event location is outside the coasting guidance area.

Figure 6:
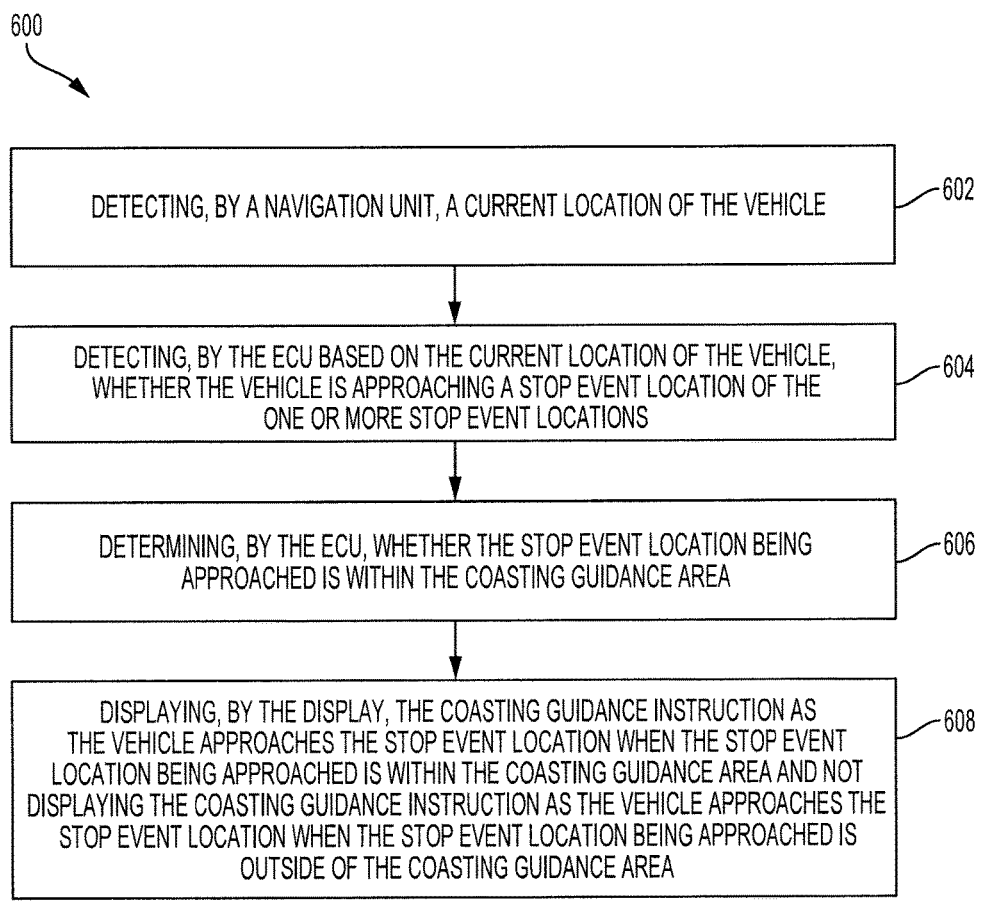
FIG. 6 is a flow diagram of an example process for selectively displaying coasting guidance instructions, according to an aspect of the invention.

FIG. 6 is a flow diagram of an example process 600 for selectively displaying a coasting guidance instruction after a coasting guidance area and coasting guidance exclusion area have been established by the user. One or more computers or one or more data processing apparatuses, for example, the ECU 312 of the coasting guidance system 300 of FIG. 3, appropriately programmed, may implement the process 600.

As the vehicle 302 approaches a stop event location, a coasting guidance instruction may be provided, instructing the driver to release the brake pedal and the accelerator pedal so that the vehicle 302 may coast. By coasting, the vehicle 302 may minimize use of friction brakes and the vehicle 302 may generate electricity via regenerative braking. However, after the user (e.g., the driver) identifies a coasting guidance exclusion area, coasting guidance instructions may accordingly not be presented when the vehicle 302 is approaching a stop event location within the coasting guidance exclusion area. The user of the vehicle 302 may wish to maintain privacy of where the user has been driving and/or may also wish to limit distractions by designating an area as a coasting guidance exclusion area. If the coasting guidance instructions were still presented within the coasting guidance exclusion area, a passenger may infer that the user has been travelling frequently in the current area surrounding the vehicle 302, In addition, the user may be distracted by the coasting guidance instructions.

The navigation unit 326 detects a current location of the vehicle 302 (step 602). The coasting guidance system 300 may determine the current location using the navigation unit 326 by using a GPS receiver to determine the current location of the vehicle 302.

The ECU 312 determines, based on the current location of the vehicle 302, whether the vehicle 302 is approaching a stop event location (step 604). The stop event location may be stored in the memory 322, which may store one or more additional stop event locations. Location information associated with each stop event location may also be stored in the memory 322. The ECU 312 may determine whether the vehicle 302 is approaching a stop event location when the vehicle 302 is travelling in a direction toward the stop event location and the vehicle 302 is within a threshold range of the stop event location. For example, in FIG. 2B, when the vehicle 302 is at location 212, the ECU 312 may determine the vehicle 302 is approaching the stop event location 216 when the vehicle 302 is travelling toward the stop event location 216, eastbound in this example, and is within the threshold distance, for example, within 0.5 miles.

The ECU 312 determines whether the stop event location being approached is within the coasting guidance area (step 606). For example, in FIG. 2A, when the current location of the vehicle 302 is at location 212, the vehicle 302 may be approaching a stop event location 216. The stop event location 216 is outside of the coasting guidance area 206B, as shown in FIG. 2B. In contrast, when the current location of the vehicle 302 is at location 214 in FIG. 2A, the vehicle 302 may be approaching a stop event location 218. The stop event location 218 is within the coasting guidance area 206B, as shown in FIG. 2B. As described herein, the ECU 312 may determine whether the stop event location being approached is within the coasting guidance area by comparing location information associated with the stop event location 216 and location information associated with the coasting guidance area 206B and/or location information associated with the coasting guidance exclusion area 206A.

When the stop event location being approached is within the coasting guidance area, the display 102 displays the coasting guidance instruction, and when the stop event location being approached is outside of the coasting guidance area (i.e., within the coasting guidance exclusion area or not within the coasting guidance area), the display 102 does not display the coasting guidance instruction (step 608). For example, in FIG. 2B, when the vehicle 302 is at location 214, approaching stop event location 218 within the coasting guidance area, the display 102 of the vehicle 302 displays a coasting guidance instruction. When the vehicle 302 is at location 212, approaching stop event location 216 outside of the coasting guidance area, the display 102 of the vehicle 302 does not display the coasting guidance instruction.

In addition, in some embodiments, the coasting guidance system 300 may disable use of one or more components of the coasting guidance system 300 when the vehicle 302 is currently located in a coasting guidance exclusion area, in order to conserve system resources. For example, in FIG. 2B, if the vehicle 302 is at location 212 within the coasting guidance exclusion area 206A, the coasting guidance system 300 may disable or limit use of one or more components, such as the sensor 308, the ECU 312, and/or the memory 322.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for storing and displaying a map indicating previous coasting locations where coasting guidance was provided to a driver of a vehicle, the coasting guidance indicating when the driver should disengage from a brake pedal of the vehicle and an accelerator pedal of the vehicle, the system comprising:
   an electronic control unit (ECU) configured to determine a coasting location where coasting guidance is provided as the vehicle approaches the coasting location;
   a memory connected to the ECU, the memory configured to store one or more previously determined coasting locations; and
   a display connected to the ECU, the display configured to:
      display the stored one or more previously determined coasting locations on the map,
      receive, from a user, a selection of a coasting guidance area on the map, the coasting guidance area being a portion of the map where previously determined coasting locations should be displayed on the map, and
      selectively display the portion of the one or more previously determined coasting locations on the map such that a previously determined coasting location outside of the coasting guidance area is absent from the map.

2. The system of claim 1, wherein the coasting guidance area is a closed area on the map identified by the user.

3. The system of claim 1, wherein the coasting guidance area is an area of the map other than a closed area on the map identified by the user.

4. The system of claim 1, further comprising:
   a navigation unit configured to detect a current location of the vehicle, and
   wherein the ECU is further configured to:
      determine a location of a new coasting location,
      determine, based on the current location of the vehicle, whether the location of the new coasting location is within the coasting guidance area, and
      store the location of the new coasting location in memory when the location of the new coasting location is within the coasting guidance area.

5. The system of claim 1, further comprising a navigation unit configured to detect a current location of the vehicle, wherein the ECU is further configured to:
   detect, based on the current location of the vehicle, whether the vehicle is approaching a coasting location of the one or more coasting locations, and
   determine whether the coasting location being approached is within the coasting guidance area, and
   wherein the display is configured to provide the coasting guidance as the vehicle approaches the coasting location when the coasting location being approached is within the coasting guidance area.

6. The system of claim 1, wherein the display is further configured to:
receive, from the user, an indication to display removed coasting locations located outside of the coasting guidance area, and
display the removed coasting locations on the map.

7. The system of claim 1, further comprising a navigation unit configured to detect a current location of the vehicle,
wherein the coasting location is determined based on sensor data detected by a sensor, and
wherein the detection of sensor data is disabled when the current location of the vehicle is outside of the coasting guidance area.

8. The system of claim 1, wherein the ECU is further configured to identify a portion of the stored one or more coasting locations based on the indicated coasting guidance area, the portion of the one or more coasting locations being within the coasting guidance area.

9. A vehicle comprising:
an electronic control unit (ECU) configured to determine a coasting location where coasting guidance is provided as the vehicle approaches the coasting location, the coasting guidance indicating when a driver of the vehicle should disengage from a brake pedal of the vehicle and an accelerator pedal of the vehicle;
a memory connected to the ECU, the memory configured to store one or more previously determined coasting locations; and
a display connected to the ECU, the display configured to:
display the stored one or more previously determined coasting locations on the map,
receive, from a user, a selection of a coasting guidance exclusion area on the map, the coasting guidance exclusion area being a portion of the map where previously determined coasting locations should not be displayed on the map,
and
selectively display the portion of the one or more step previously determined coasting locations on the map such that a previously determined coasting location inside the coasting guidance exclusion area is absent from the map.

10. The vehicle of claim 9, wherein the coasting guidance exclusion area is a closed area on the map identified by the user.

11. The vehicle of claim 9, wherein the coasting guidance exclusion area is an area of the map other than a closed area on the map identified by the user.

12. The vehicle of claim 9, further comprising:
a navigation unit configured to detect a current location of the vehicle, and
wherein the ECU is further configured to:
determine a location of a new coasting location,
determine, based on the current location of the vehicle, whether the location of the new coasting location is within the coasting guidance exclusion area, and
disregard the location of the new coasting location when the new coasting location is within the coasting guidance exclusion area, such that the location of the new coasting location is not stored in memory.

13. The vehicle of claim 9, further comprising a navigation unit configured to detect a current location of the vehicle,
wherein the ECU is further configured to:
detect, based on the current location of the vehicle, whether the vehicle is approaching a coasting location of the one or more coasting locations, and
determine whether the coasting location being approached is within the coasting guidance exclusion area, and
wherein the display does not display the coasting guidance instruction as the vehicle approaches the coasting location when the coasting location being approached is within the coasting guidance exclusion area.

14. The vehicle of claim 9, further comprising a navigation unit configured to detect a current location of the vehicle,
wherein the ECU is further configured to:
detect, based on the current location of the vehicle, whether the vehicle is approaching a coasting location of the one or more coasting locations, and
determine whether the coasting location being approached is within the coasting guidance exclusion area, and
wherein the display provides the coasting guidance as the vehicle approaches the coasting location regardless of whether the coasting location being approached is within the coasting guidance exclusion area.

15. The vehicle of claim 9, further comprising a navigation unit configured to detect a current location of the vehicle,
wherein the coasting location is determined based on sensor data detected by a sensor, and
wherein the detection of sensor data is disabled when the current location of the vehicle is inside of the coasting guidance exclusion area.

16. The vehicle of claim 9, wherein the ECU is further configured to identify a portion of the stored one or more coasting locations based on the indicated coasting guidance exclusion area, the portion of the one or more coasting locations being within the coasting guidance exclusion area.

17. A method for storing and displaying a map indicating previous coasting locations where coasting guidance was provided to a driver of a vehicle, the coasting guidance indicating when the driver should disengage from a brake pedal of the vehicle and an accelerator pedal of the vehicle, the method comprising:
determining, by an electronic control unit (ECU), a coasting location where coasting guidance is provided as the vehicle approaches the coasting location;
storing, by a memory connected to the ECU, one or more previously determined coasting locations;
displaying, by a display connected to the ECU, the stored one or more previously determined coasting locations on the map;
receiving, by the display from a user, a selection of a coasting guidance area on the map, the coasting guidance area being a portion of the map where previously determined coasting locations should be displayed on the map;
identifying, by the ECU, a first portion of the stored one or more previously determined coasting locations based on the indicated coasting guidance area, the first portion of the one or more previously determined coasting locations being within the coasting guidance area;
identifying, by the ECU, a second portion of the stored one or more previously determined coasting locations based on the indicated coasting guidance area, the second portion of the one or more coasting locations being outside of the coasting guidance area; and selectively displaying, by the display, the first portion of the one or more coasting locations on the map such that only the first portion of the one or more coasting locations are displayed on the map and the second portion of the one or more coasting locations are not displayed on the map.

18. The method of claim 17, wherein the coasting guidance area is a closed area on the map identified by the user.

19. The method of claim 17, wherein the coasting guidance area is an area of the map other than a closed area on the map identified by the user.

20. The method of claim 17, further comprising:

detecting, by a navigation unit, a current location of the vehicle;

determining, by the ECU, a location of a new coasting location;

determining, by the ECU, based on the current location of the vehicle, whether the location of the new coasting location is within the coasting guidance area;

storing, by the memory, the location of the new coasting location when the location of the new coasting location is within the coasting guidance area; and disregarding the location of the new coasting location when the location of the new coasting location is outside the coasting guidance area such that the location of the new coasting location is not stored by the memory.

21. The method of claim 17, further comprising:

detecting, by a navigation unit, a current location of the vehicle;

detecting, by the ECU based on the current location of the vehicle, whether the vehicle is approaching a coasting location of the one or more coasting locations;

determining, by the ECU, whether the coasting location being approached is within the coasting guidance area; and providing the coasting guidance as the vehicle approaches the coasting location when the coasting location being approached is within the coasting guidance area and not providing the coasting guidance as the vehicle approaches the coasting location when the coasting location being approached is outside of the coasting guidance area.

22. The method of claim 17, further comprising:

receiving, by the display from the user, an indication to display removed coasting locations located outside of the coasting guidance area; and displaying, by the display, the removed coasting locations on the map.

* * * * *